United States Patent [19]
Schmidt

[11] Patent Number: 4,791,809
[45] Date of Patent: Dec. 20, 1988

[54] CIRCUIT ARRANGEMENT TO DETECT SIGNALS INDICATING A CHANGE IN CURRENT THROUGH A NEEDLE LIFT SENSOR OF AN INJECTION NOZZLE IN COMBUSTION ENGINES, WHICH IS CONNECTED TO A CONSTANT DIRECT VOLTAGE SUPPLY

[75] Inventor: Karl H. Schmidt, Vienna, Austria

[73] Assignee: Voest-Alpine Friedmann Gesselschaft M.B.H., Linz, Austria

[21] Appl. No.: 933,221

[22] PCT Filed: Feb. 19, 1986

[86] PCT No.: PCT/AT86/00014
§ 371 Date: Nov. 17, 1986
§ 102(e) Date: Nov. 17, 1986

[87] PCT Pub. No.: WO86/05235
PCT Pub. Date: Sep. 12, 1986

[30] Foreign Application Priority Data
Mar. 8, 1985 [DE] Fed. Rep. of Germany ....... 3508335

[51] Int. Cl.$^4$ ............................................. F02B 49/00
[52] U.S. Cl. .................................... 73/119 A; 328/1; 307/290; 307/494; 123/478
[58] Field of Search ............... 307/290, 494; 123/478, 123/494; 328/1; 73/119 A, 119

[56] References Cited

U.S. PATENT DOCUMENTS

| | | | |
|---|---|---|---|
| 3,096,448 | 7/1963 | Stratos | 307/290 |
| 3,828,247 | 8/1974 | Kirsch et al. | 73/119 A |
| 3,884,195 | 5/1975 | Murtin et al. | 123/494 |
| 4,123,729 | 10/1978 | Buetemeister | 123/494 |
| 4,227,095 | 10/1980 | Bazil | 307/494 |
| 4,459,493 | 7/1984 | Moore | 307/494 |
| 4,541,271 | 9/1985 | Flaig et al. | 73/119 A |
| 4,562,362 | 12/1985 | Stenbock | 307/290 |
| 4,573,347 | 3/1986 | Sekiguchi et al. | 123/494 |

FOREIGN PATENT DOCUMENTS

24531 3/1981 European Pat. Off. .
1613663 10/1970 Fed. Rep. of Germany .

OTHER PUBLICATIONS

"Voltage-regulated power supply delivers constant current", Thomas E. Skopal, *Electronics*, Dec. 12, 1974, page 126.

*Primary Examiner*—John S. Heyman
*Attorney, Agent, or Firm*—Thomas R. Vigil

[57] ABSTRACT

A circuit arrangement to detect signals indicating a change in the current of a needle lift sensor of an injection nozzle in combustion engines, which is connected to a constant direct current supply.

This circuit arrangement, which is intended to detect the signals indicating a change in current that are emitted by a needle lift sensor $Z_s$ of an injection nozzle in combustion engines that is connected to a direct current source, is designed in such a way that it will also detect minor signals indicating a change in current under the conditions prevailing in motor vehicles, which exhibit a high level of interference. For this purpose, the sensor ($Z_s$) is connected to the controlled outlet (4) of a controlled direct current source (1) and a sensing resistor ($R_M$) is connected between the outlet (3) of the regulating amplifier (2) and the outlet of the direct current source (1); the outlet (3) of the regulating amplifier (2) is connected to the input of an AC amplifier (5) with band-pass characteristics, and the outlet of the AC amplifier (5) is connected to the input of a Schmitt trigger (7), the output signal ($U_A$) of which represents the changes in the sensor current ($I_s$).

9 Claims, 3 Drawing Sheets

CIRCUIT ARRANGEMENT TO DETECT SIGNALS INDICATING A CHANGE IN CURRENT THROUGH A NEEDLE LIFT SENSOR OF AN INJECTION NOZZLE IN COMBUSTION ENGINES, WHICH IS CONNECTED TO A CONSTANT DIRECT VOLTAGE SUPPLY

This invention relates to a circuit arrangement to detect signals indicating a change in current through a needle lift sensor of an injection nozzle in combustion engines, which is connected to a in the circuit arrangement.

In the case of combustion engines with fuel injection, injection valves are utilized, in which the valve needle, under the pressure of the fuel that is to be injected, is moved against the force of a spring for a short time and periodically. By doing so it is lifted off its valve seat. Since an optimal regulation would require knowing the exact moment of injection, as well as the duration of injection, injection valves with integrated needle lift sensors have been developed which supply an output signal depending on the location of the nozzle needle, often magnetically by means of utilizing reverberating elements.

In a commercially available injection nozzle of this type, the sensor is supplied with a constant direct voltage and when the valve is opened a change in current of approximately 10% occurs, which amounts to less than one milliampere. In conventional combustion engines the duration of the sensor pulse is approximately between 0.5 and 15 ms; the distance between them is approximately 50 and 250 ms. Because of its minor relative and absolute magnitude, it is often difficult to detect this change in current, especially due to the high level of interference prevailing in motor vehicles. Furthermore, even negligible changes in the supply current can result in changes in the current, which could be misunderstood as pulses of the needle lift sensor and it has to be taken into account that the duty factor can range from approximately 0.2 to 25%.

It is an object of the invention to create a circuit arrangement which would allow for a reliable detection of such changes in current under the conditions predominant in motor vehicles and which would require little effort.

This object can be achieved by means of a circuit arrangement of the type mentioned above, in which, according to the invention, the sensor is located at the controlled outlet of a controlled source of direct voltage and a sensing resistor is connected between the outlet of the regulating amplifier and the outlet of the source of direct voltage. In addition, the outlet of the regulating amplifier is connected to the input of an AC amplifier with a band-pass characteristics and the outlet of the AC amplifier is connected to the input of a Schmitt trigger, the output signal of which represents the changes occurring in the sensor current.

According to the invention, a circuit arrangement which is especially resistant to interference is characterized by having the sensor located at the output terminals of a controlled direct voltage source with two symmetrically-working regulating amplifiers, by connecting one sensing resistor between each of the outlets of the regulating amplifiers and the output terminals of the direct voltage source respectively, by connecting the outlets of the regulating amplifiers with the inputs of a symmetrical AC amplifier with a band-pass characteristics, and by connecting the outlet of the AC amplifier with the input of a Schmitt trigger, the output signal of which represents the changes in the sensor current.

In order to also substantially suppress the interferences caused by the grounding, it is advisable to connect a filter capacitor between the reference voltage inputs of both regulating amplifiers, each of which is connected to a pole of the reference voltage via one resistor each.

It has also proven advantageous to equip the automatic control amplifier(s) with a capacitor in the feedback path in order to achieve low-pass characteristics.

For the purpose of an increased resistance against interference it is advisable to maintain the lower boundary frequency of the AC amplifier between 5 and 10 Hz and the upper boundary frequency between 15 and 30 KHz.

Moreover, it is advisable if the regulating time constant of the controlled direct voltage source were at a value below 1 $\mu$s, preferably below 0.5 $\mu$s.

The invention and all its additional advantages and features is described below in the embodiment of the present invention which is illustrated in the drawings.

BRIEF DESCRIPTION OF THE DRAWINGS

Finally.

Figure 1:
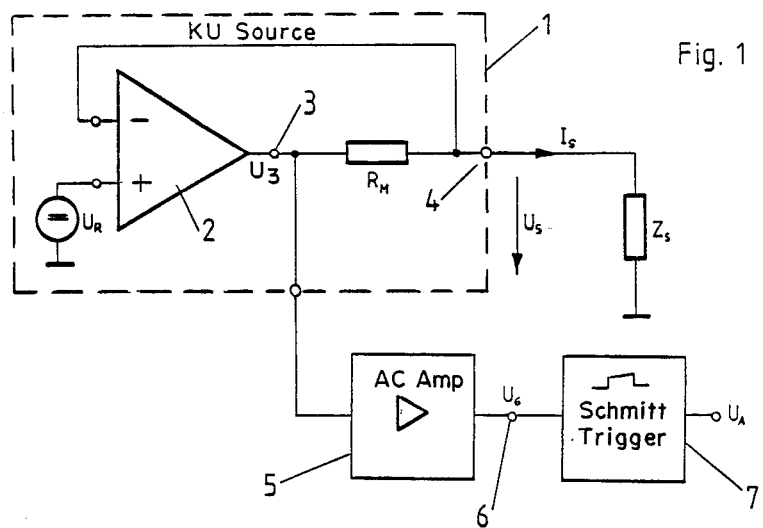
FIG. 1 is a block diagram of the circuit arrangement according to the invention.

According to FIG. 1, a control pulse generating circuit 1 supplies the needle lift sensor $Z_s$ of an injection nozzle. The circuit 1 has a regulating amplifier 2, to the not-inverted input of which a reference direct voltage $U_R$ is connected. Between the outlet 3 of the amplifier 2 and the outlet 4 of the circuit 1 is a sensing resistor $R_M$, and the outlet 4, at which the sensor Zs is located, is connected to the inverted input of the amplifier 2 in order to form the control loop. The outlet 3 of the regulating amplifier 2 is connected with the input of an AC amplifier 5, the outlet 6 which is yet again connected with the input of a Schmitt trigger 7. The desired output signal $U_A$ occurs at the outlet of the Schmitt trigger 7.

The circuit arrangement according to the invention works in the following way. The circuit voltage 1 supplies a constant voltage Us of, for example, 5 V at the controlled outlet 4 and the current Is, for example 4 mA, flows through the sensor Zs. When the valve needle of the injection nozzle is opened, the current Is decreases negligibly by, for example, 400 $\mu$A (see diagram a of FIG. 2). Since the circuit 1 has a short recovery time constant—if the connecting wire to the sensor has a capacity of 500 pF, it is usually 0.5 $\mu$s or less—the voltage $U_s$ across the sensor $Z_s$ is correspondingly adjusted rather quickly; however, during the signal of the sensor, the voltage $U_3$ decreases at the outlet 3 of the regulating amplifier 2, for example, by 220 mV (see diagram b of FIG. 2).

Figure 2:
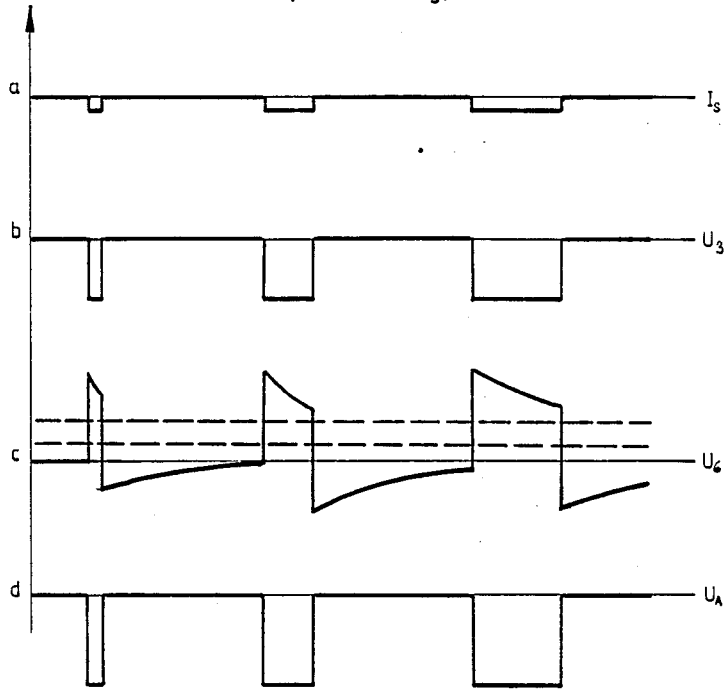
FIG. 2 is a diagram of the chronological order of several signals of the circuit.

The AC amplifier 5 increases this voltage and a voltage U6 occurs at the outlet 6 of this amplifier; this is illustrated in diagram c of FIG. 2. The amplitude of these voltage pulses is about 4 V. The lower boundary frequence of the amplifier is between approximately 5 to 10 Hz. In the following example of a circuit arrangement (FIG. 3), 7 Hz were selected in order to maintain the necessary direct current division on the one hand and to avoid that long-term changes in voltage (drift) are interpreted as needle lift signals on the other hand. The upper boundary frequence should be limited to approximately 15 to 30 kHz; for the following embodiment 13 kHz were selected. In this way, short-term peaks of interference, which often occur in motor vehicles, are to be suppressed. The output voltage $U_6$ of the AC amplifier 5 is led to the Schmitt trigger 7, the switch thresholds of which are connected in such a way that the signal edges of $U_6$ can be reliably picked-up, also when the needle lift signals are of the longest-occurring duration. This is illustrated in diagram c of FIG. 2, in which the switch thresholds of the Schmitt trigger 7 are indicated by broken lines. Then the output voltage $U_A$ occurs with an amplitude of, for example 5 V, at the outlet of the Schmitt trigger (see diagram d of FIG. 2). The chronological order of the voltage $U_A$ corresponds to the sensor signals and can be led to a control unit to regulate and the control the combustion engine.

Figure 3:
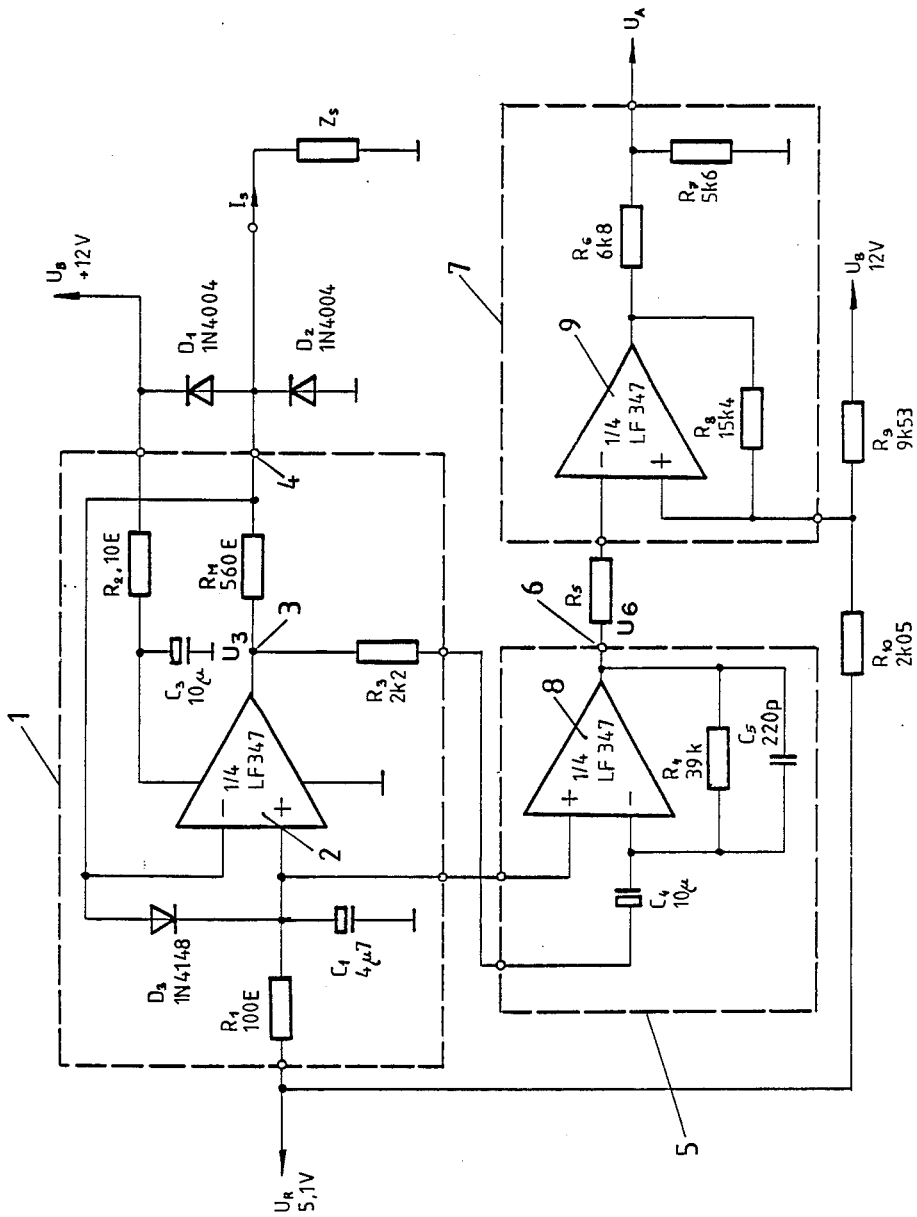
FIG. 3 is a circuit illustrated in detail.

FIG. 3 depicts a practical circuit arrangement utilizing three identical operational amplifiers. The controlled source of direct voltage 1 contains an operational amplifier 2. The operational amplifier's not-inverted input is supplied with a reference voltage $U_R$ via a filter element $R_1$, $C_1$. The outlet 3 of the operational amplifier is connected to the outlet 4 of the direct voltage source 1 via a sensing resistor $R_M$; the needle lift sensor $Z_s$ is connected between this outlet 4 and the grounding, and a protective diode $D_1$, $D_2$ is connected from this outlet 4 to the grounding and to the operational voltage $U_8$ respectively. Furthermore, a diode $D_3$ located in the low-resistance direction is led from the outlet 4 to the not-inverted input of the amplifier 2. In this way, an overvoltage on the sensor is avoided when the machine is turned off or in case of a failure in the reference voltage. The operational voltage $U_8$ is led to the amplifier 2 via a filter element $R_2$, $C_3$. The outlet 3 of the amplifier 2 is connected with its inverted input to form the control loop.

The AC amplifier 5 also contains an operational amplifier 8, the not-inverted input of which is connected to the reference voltage $U_R$ to determine the operating point. The not-inverted input of the operational amplifier 8 is connected to the outlet 3 of the amplifier 2 via the series connection of a resistor $R_3$ and a capacitor $C_4$. A parallel-RC-module $R_4$, $C_5$ is located in the feedback path of the operational amplifier 8.

The Schmitt trigger 7 also contains an operational amplifier 9, the inverted input of which is connected to the outlet 6 of the AC amplifier 5 via a resistor $R_5$. The outlet of the operational amplifier 9 is connected to the grounding via a voltage divider $R_6$, $R_7$. The output voltage $U_A$ is picked-up on the voltage divider. The outlet of the amplifier 9 is led to the not-inverted input via a resistor $R_8$. In addition, this input is connected to the operational voltage $U_8$ via a resistor $R_9$ on the one hand, or it is connected to the reference voltage $U_R$ via resistor $R_{10}$ on the other hand. Consequently, the operating point of the amplifier and/or the switch threshold of the Schmitt trigger—as the dimensioning in FIG. 3 shows clearly, these values are +0.6 V or +1.7 V—are determined by the voltages $U_R$ and $U_B$, as well as by the resistors $R_8$ to $R_{10}$.

It should be noted here that signal values mentioned in connection with the block diagram of FIG. 1, refer to the dimensioning of FIG. 3. The output voltage $U_A$ corresponds to the standardized CMOS-level; therefore, it can be processed further on a digital basis.

Figure 4:
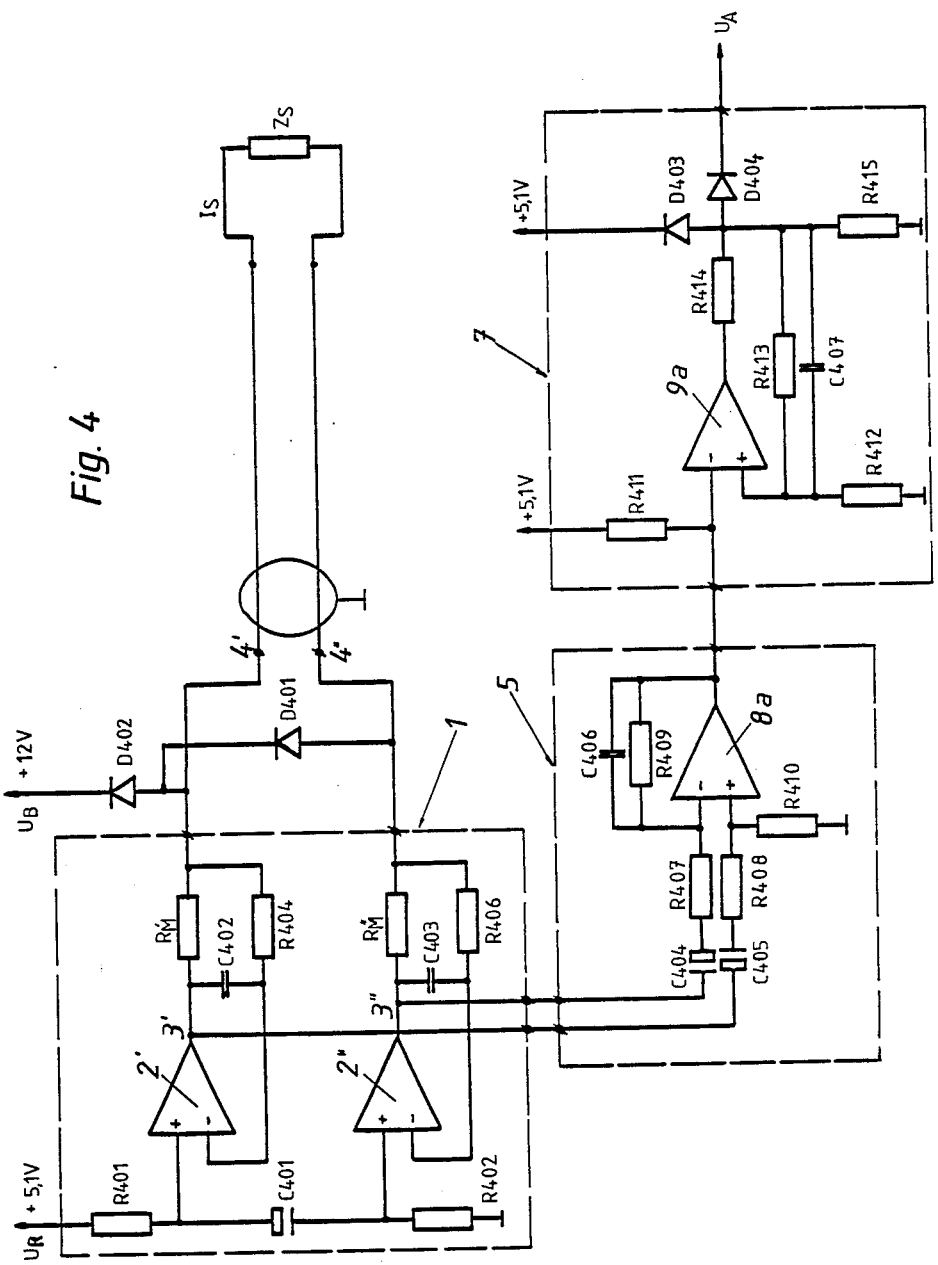
FIG. 4 shows a similar circuit with an even higher resistance against interference.

The circuit illustrated in FIG. 4 differs from the circuit illustrated in FIG. 3 in several details. Above all, because the circuit 1 contains two symmetrically-working regulating amplifiers 2', 2" and because the AC amplifier 5 is designed as a differential amplifier.

In particular, the circuit 1 contains two operational amplifiers 2', 2", and the not-inverted input of the first operational amplifier 2' is connected to the reference voltage via a resistor $R_{401}$ and the non-inverted input of the second operational amplifier 2" is connected to the grounding via a resistor $R_{402}$. A filter capacitor $C_{401}$ is connected between the two inputs mentioned. By means of this symmetrical filtering of the reference voltage different interference factors, for example factors that are let in through the grounding, can be eliminated.

Each of the outlets of the operational amplifiers 2', 2" are led to the output terminals 4', 4" of the circuit 1 via a sensing resistor $R'_M$, $R''_M$ respectively. The needle lift sensor $Z_s$ is connected to the circuit mentioned above via a shielded cable and, similar to the circuit illustrated in FIG. 3, two protective diodes $D_{401}$, $D_{402}$ are connected to the output terminals. One capacitor $C_{402}$ or $C_{403}$ and one resistor $R_{404}$ or $R_{406}$ are located in the feedback path of each of the amplifiers 2', 2" to provide the amplifier interferences with a higher frequency.

The AC amplifier 5 contains an operational amplifier 8a which works as a differential amplifier. Each of its two inputs is connected to the outlets 3', 3" of the regulating amplifier 2', 2" via a RC-module $C_{404}/R_{407}$ or $C_{405}/R_{408}$ respectively. The not-inverted input is connected to the grounding via a resistor $R_{410}$. The feedback path of the amplifiers consists of a parallel-RC module $C_{406}/R_{409}$. It is obvious that the amplifier 5 of this embodiment also has band-pass characteristics like the one described in the prior embodiment.

The Schmitt trigger 7 contains an operational amplifier 9a, the inverted input of which is connected to the outlet of the AC amplifier 5. The not-inverted input is connected to the grounding via a resistor $R_{412}$.

The outlet of the operational amplifier is connected to the grounding via a voltage divider $R_{414}$, $R_{415}$. The output voltage $U_A$ is picked-off the voltage divider via a diode $D_{404}$ and another diode $D_{403}$ leads from the point of division to the reference voltage $U_R$ (5.1 V). The point of division is connected to the not-inverted input of the amplifier 9a via a resistor $R_{413}$. A capacitor $C_{407}$, which is connected in series, is utilized to improve the edge steepness.

The diode $D_{403}$, $D_{404}$ located at the output of the Schmitt trigger effect the following: the diode $D_{403}$ sets the output voltage to the value $U_R+U_D$ (=voltage drop on the diode path); in this connection, it should be noted that all operational amplifiers operate with a voltage $U_B$ (12 V), which is higher than $U_R$ (5.1 V). The diode $D_{404}$ compensates for the voltage drop that occurs at the diode $D_{403}$ so that the voltage at the output is exactly the voltage $U_R$ or the voltage "zero".

In comparison to the circuit illustrated in FIG. 3, the circuit just described has the advantage of improved resistance against interference. This is achieved, on the one hand, by the aforementioned symmetrical, ungrounded feed and filtering of the reference voltage in the circuit 1 and, on the other hand, by the symmetrical and ungrounded feed of the direct voltage to the sensor $Z_s$. Simultaneous inductive pick-up, on the connection line between sensor $Z_s$ and circuit voltage 1 are suppressed as well as capacity pick-up on the sensor.

The circuit arrangement according to the invention guarantees a reliable detection of the weak current signals emitted by the needle lift sensor in motor vehicles despite the strong electromagnetic interference that occurs there. The function of the circuit remains unaffected for tolerances of the needle lift signal up to approximately +/−10%. Furthermore, it should be noted that the invention is also applicable to needle lift sensors, the current of which increases when the valve needle opens.

I claim:

1. A control pulse generating circuit responsive to the position of a valve needle for indicating the position of the needle in a combustion engine fuel injector comprising:

a reference voltage source; a regulating operational amplifier having a minus (−) input, a plus (+) input and a regulated output (3) supplying a regulating voltage, said reference voltage source being coupled to said plus (+) input; a sensing resistor connected at one end to said regulating output (3) and supplying a source voltage ($U_S$) at the other end which defines a regulated voltage source output (4), said other end of said sensing resistor connected to said minus (−) input;

a needle sensor, having a sensor impedance $Z_s$, operatively connected in a fuel injector such that the sensor impedance of said needle sensor changes between the open position of the valve needle of the fuel injector and the closed position of the valve needle of the fuel injector, said sensor being connected to said source output at the other end of said sensing resistor, to receive the source voltage and consuming a sensor current, $I_S$;

a band pass amplifier having an amplifier input and an amplifier output, said amplifier input being connected to said regulating output (3) having a voltage ($U_3$), which is responsive to said sensor current, whereby an amplified voltage ($U_6$) is provided to said amplifier output; and a Schmitt trigger, having a trigger input and a trigger output, said trigger input being coupled to said amplifier output to receive the amplified voltage ($U_6$) so that the trigger output has pulses ($U_A$) of varying width indicating the position of the valve needle of the fuel injector.

2. The control circuit of claim 1 having a regulating time constant in said regulating operational amplifier of less than 1 microsecond.

3. The control circuit of claim 2 wherein said regulating time constant in said regulating operational amplifier is less than one half microsecond.

4. A control pulse generating circuit responsive to the position of a valve needle for indicating the position of the needle in a combustion engine fuel injector comprising:

a reference voltage source, a differential circuit having a differential output between a first output terminal and a second output terminal, a first regulating operational amplifier having a first minus (−) input, a first plus (+) input and a first signal output (3′) supplying a first regulating voltage, a second regulating operational amplifier having a second minus (−) input, a second plus (+) input and a second signal output (3″) supplying a second regulating voltage, said reference voltage source being coupled to said first plus input and to said second plus input so that said first regulating amplifier and said second regulating amplifier are operated symmetrically about a symmetric voltage, a first sensing resistor ($R'_M$) connected between said first operational amplifier output and said first regulating output and supplying a first source voltage to said first output terminal (4′), and a second sensing resistor ($R''_M$) connected between said second operational amplifier output and said second regulating output and supplying a second source voltage to said second output terminal (4″) whereby a regulating constant DC-voltage is provided between said first and second output terminals (4′, 4″);

a needle sensor, having a sensor impedance ($Z_S$), operatively connected to a fuel injector so that the sensor impedance of said needle sensor changes between the open position of said valve needle of said fuel injector and the closed position of said valve needle of said fuel injector, said needle sensor being connected between said first output terminal (4′) and said second output terminal (4″) to receive a differential source voltage and consuming a sensor current;

a differential band pass amplifier having a differential input and a differential output, said differential inputs being connected individually to said first and second signal outputs (3′, 3″) and receiving the difference between said first regulating voltage and said second regulating voltage, the difference between which is responsive to said sensor current so that an amplified regulated differential signal voltage is provided to said differential output, and a Schmitt trigger, having a trigger input and a trigger output, said trigger input being coupled to said amplifier output to receive the amplified differential signal voltage so that the trigger output is in the form of pulses of varying width indicating the position of the valve needle of the fuel injector.

5. The control circuit of claim 4 further including:

a first resistor connected between said first plus (+) input and said plus side of said reference voltage;

a second resistor connected between said second plus (+) input and said minus side of said reference voltage; and a filter capacitor connected between said first plus (+) input and said second plus (+) input.

6. The control circuit of claim 4 wherein each regulatory operational amplifier has a low pass capacitor connected in a path between said output (3′ or 3″) and said minus (−) input of said regulating operational amplifier so that higher frequencies between 15 and 30 KHz are not amplified by said regulating operational amplifier.

7. The control circuit of claim 4 wherein said differential band pass amplifier has a lower boundary frequency between 5 and 10 Hz and an upper boundary frequency between 15 and 30 KHz.

8. The control circuit of claim 4 having a regulating time constant in said regulating operational amplifiers of less than 1 microsecond.

9. The control circuit of claim 8 wherein said regulating time constant in said regulating operational amplifiers is less than one half microsecond.

* * * * *